(12) United States Patent
Eastwood et al.

(10) Patent No.: US 6,662,112 B2
(45) Date of Patent: Dec. 9, 2003

(54) METHOD FOR CLASSIFYING AVO DATA USING AN INTERPRETER-TRAINED NEURAL NETWORK

(75) Inventors: John E. Eastwood, Bellaire, TX (US); Brian P. West, Houston, TX (US); Michael D. Gross, Sandnes (NO); Dwight C. Dawson, Spring, TX (US); David H. Johnston, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/231,902

(22) Filed: Aug. 29, 2002

(65) Prior Publication Data

US 2003/0046006 A1 Mar. 6, 2003

Related U.S. Application Data

(60) Provisional application No. 60/316,468, filed on Aug. 31, 2001.

(51) Int. Cl.[7] ................................................. G01V 1/28
(52) U.S. Cl. ........................................................ 702/14
(58) Field of Search .............................. 702/14, 18, 17, 702/16; 367/73; 703/2, 5, 10

(56) References Cited

U.S. PATENT DOCUMENTS

| | | | |
|---|---|---|---|
| 5,465,323 A | 11/1995 | Mallet | 392/123 |
| 5,859,925 A | 1/1999 | Yaeger et al. | 382/158 |
| 5,940,777 A | 8/1999 | Keskes | 702/16 |
| 6,044,328 A | 3/2000 | Murphy et al. | 702/11 |
| 6,236,942 B1 | 5/2001 | Bush | 702/14 |
| 6,438,493 B1 * | 8/2002 | West et al. | 702/2 |
| 6,560,540 B2 * | 5/2003 | West et al. | 702/14 |

FOREIGN PATENT DOCUMENTS

| WO | WO 97/11392 | 3/1997 |
|---|---|---|
| WO | WO 00/16125 | 3/2000 |

OTHER PUBLICATIONS

Sun et al., 2000, "AVO Inversion by Artificial Neural Networks", SEG Calgary 70th Annual Meeting, Aug. 6–11, 2000, pp. 130–133.

Baltz and Pivot, 2000, "Fast Identification of AVO Anomalies Using Classification of Pre–Stack Waveforms", SEG 2000 Expanded Abstracts, SEG Int'l Expo. and 70th Annual Meeting, Calgary, Alberta, Canada, Aug. 6–11, 2000.

DeGroot, 1999, "A Method for Transforming One or More Seismic Input Cubes to One or More Seismic Output Cubes by Way of Neural Network Mapping", EAGE Conference, 1999.

Johnston, D. H, Eastwood, J. E., and Shyeh, J., 2000, "Using Legacy Sesimic Data in an Integrated Time–Lapse Study: Lena Field, Gulf of Mexico", The Leading Edge, Mar. 2002, pp. 294–302.

(List continued on next page.)

*Primary Examiner*—Donald E. McElheny, Jr.
(74) *Attorney, Agent, or Firm*—J. Paul Plummer

(57) ABSTRACT

AVO anomalies are classified in near-offset and far-offset seismic data volumes, by first calculating a plurality of initial AVO seismic attributes representative of the offset seismic data volumes. A probabilistic neural network is constructed from the calculated initial AVO seismic attributes. AVO anomaly classifications are calculated in a portion of the offset seismic data volumes. The preceding steps are repeated until the calculated AVO anomaly classifications in the portion of the offset seismic data volumes are satisfactory. AVO anomaly classifications are calculated throughout the offset seismic data volumes using the constructed probabilistic neural network.

8 Claims, 1 Drawing Sheet

OTHER PUBLICATIONS

Matlock, R. J. and Asimakopoulos, G. T., 1986, "Can Seismic Stratigraphy Problems be Solved Using Automated Pattern Analysis and Recognition?" The Leading Edge, Geophys. Explor., vol. 5, No. 9, pp. 51–55.

Vinther, R., Mosegaard, K., et al., 1995, "Seismic Texture Classification: A Computer–Aided Approach to Stratigraphic Analysis", SEG International Expo and 65$^{th}$ Annual Meeting, paper SL 1.4, Oct. 8–13, pp. 153–155.

Vinther, R., Mosegaard, et al., 1996, "3D Seismic Texture Classification", SPE 35482, pp. 57–63.

Meldahl, P., Heggland, R., de Groot, P. and Bril, B., 1999, "The Chimney Cube, an Example of Semi–Automated Detection of Seismic Objects by Directive Attributes and Neural Networks: Part I–Methodology and Part II—Interpretation", SEG International Expo and 69$^{th}$ Annual Meeting, Houston.

Gao, D., 1999, "The First–Order and the Second–Order Seismic Textures: Implications for Quantitative Seismic Interpretation and Hydrocarbon Exploration", AAPG Annual Mtg, San Antonio, TX, Apr. 11–14, 1999, p. A45.

* cited by examiner

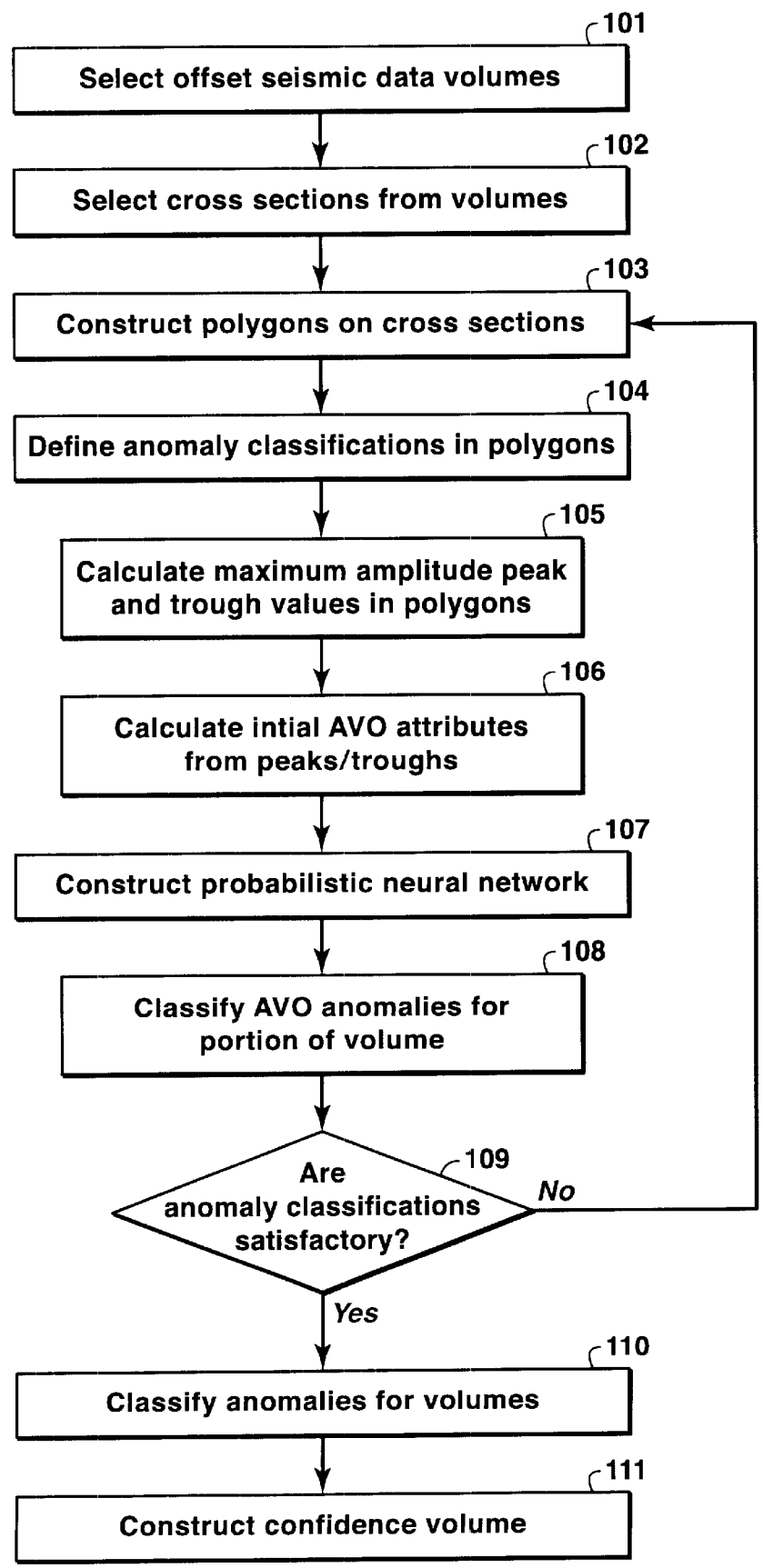

METHOD FOR CLASSIFYING AVO DATA USING AN INTERPRETER-TRAINED NEURAL NETWORK

This application claims the benefit of U.S. Provisional Application No. 60/316,468 filed Aug. 31, 2001.

BACKGROUND OF THE INVENTION

1. Field of the Invention

This invention relates generally to the field of geophysical prospecting. More particularly, the invention relates to the field of seismic data processing. Specifically, the invention is a method for classifying AVO anomalies in near-offset and far-offset seismic data volumes.

2. Description of the Related Art

AVO (Amplitude Versus Offset) analysis of multiple three-dimensional seismic data volumes requires that the volumes are properly aligned and that AVO anomalies are identified and distinguished from background trends. Recently, neural networks have been employed to assist in the identification and classification of AVO anomalies. Sun et al., "AVO Inversion by Artificial Neural Networks", SEG Calgary 70th Annual Meeting, 2000, discuss a method for training a neural network to predict the far offset response, then using the network to predict the far-offset response everywhere and compare this to the actual far-offset response. They also mention the need to align neural network-predicted and actual far-offsets with cross correlation before making the comparison. There are no details given in their paper regarding the use of sub-sample interpolation, or exploiting or generating time shift and correlation volumes in the process to filter the time shift volume. Furthermore, they do not discuss the training of the neural network on the near and far volumes, derivative AVO volumes, or the use of the cross-correlation volume for AVO classification methodology.

The conventional approach to AVO classification uses the familiar AVO cross plotting methodology to discriminate AVO anomalies from background. The most powerful feature of cross plotting is the ability to interact with the data volumes with dynamic linking to better understand the sensitivity of the spatial and geologic extent of AVO anomalies relative to the region selected in the cross plot. Several related techniques have been used in the oil industry to automate or enhance the calculation of AVO anomalies.

DeGroot, "A Method for Transforming One or More Seismic Input Cubes to One or More Seismic Output Cubes by Way of Neural Network Mapping", EAGE Conference, 1999, states that information can be obtained from multiple volumes including near-offset and far-offset stacks, gradients and intercept, acoustic impedance or 4-D volumes (3-D volumes over time). However, DeGroot does not disclose the methods necessary to perform these operations, nor the methods for dealing with residual alignment between offset volumes.

Balz and Pivot, "Fast Identification of AVO Anomalies Using Classification of Pre-Stack Waveforms", discuss a methodology using self-organizing maps or K means clustering to classify AVO response. (SEG 2000 Expanded Abstracts, Society of Exploration Geophysicists International Exposition and Seventieth Annual Meeting, Calgary, Alberta, Aug. 6–11, 2000.) Their method is designed to work with pre-stack seismic data and for a specific interval defined through horizon interpretation. Their method is interval-based, not volume-based. There is no mention of building a 3D consistent time shift volume to time align AVO cubes, or exploiting multiple attributes for AVO classification, such as cross correlation and near and far product with difference. Additionally, they do not mention the use of a probabilistic neural network approach with user defined training.

Thus, there exists a need to generate, in a computationally efficient manner, a rapid method for classifying AVO anomalies in pairs of near-offset and far-offset seismic data volumes. This process must also mimic the process employed by and results obtained manually by the seismic interpreter.

SUMMARY OF THE INVENTION

The invention is a method for classifying AVO anomalies in pairs of near-offset and far-offset seismic data volumes. First, a plurality of initial AVO seismic attributes are calculated that are representative of the offset seismic data volumes. A probabilistic neural network is constructed from the calculated initial AVO seismic attributes. AVO anomaly classifications are calculated in a portion of the offset seismic data volumes. The preceding steps are repeated until the calculated AVO anomaly classifications in the portion of the offset seismic data volumes are satisfactory. Finally, AVO anomaly classifications are calculated throughout the offset seismic data volumes using the constructed probabilistic neural network.

BRIEF DESCRIPTION OF THE DRAWINGS

The present invention and its advantages may be more easily understood by reference to the following detailed description and the attached drawing in which:

FIG. 1 is a flow chart illustrating the method of an embodiment of the present invention.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The present invention is a method for classifying AVO anomalies in a pair of near-offset and far-offset seismic data volumes. FIG. 1 is a flow chart illustrating the method of an embodiment of the present invention. First, in step 101, two three-dimensional volumes of near-offset and far-offset seismic data, respectively, are selected. These offset seismic data volumes preferably are, but are not restricted to, zero-phase, quadrature, or integrated trace basis, depending on the application. Although three-dimensional volumes of data are discussed, the method works equally well for pairs of two-dimensional data sets. These offset seismic data volumes will be used to calculate an AVO anomaly volume and corresponding confidence volumes. Preferably, the near-offset and far-offset seismic data volumes have been substantially time aligned. Any of a number of methods known in the art of seismic processing can be used for time-aligning the offset seismic data volumes. However, the preferred method is volume based and is described in a concurrently filed, copending patent application entitled, "Method for Time-Aligning Multiple Offset Seismic Data Volumes", publication No. US-2003-0043693. This method is preferred for its accuracy, speed, and versatility. This method is briefly outlined here.

Near-offset and far-offset seismic data volumes are time-aligned by first selecting a plurality of time shifts. The near-offset and far-offset seismic data volumes are cross-correlated at the plurality of time shifts. An initial time-shift volume and a maximum correlation volume are created from the maximal cross-correlations at the plurality of time shifts. Areas of high time shift from the initial time-shift volume and areas of low cross-correlation from the maximum correlation volume are determined. The determined areas of high time shift and low cross-correlation are filtered from the initial time-shift volume, generating a filtered time-shift volume. The filtered time-shift volume is applied to the far-offset seismic volume to generate a time-aligned far-offset volume.

In an alternative embodiment, at least one seismic attribute volume is calculated from the offset volumes from step 101 and used in place of one or both of the offset seismic data volumes in the following process. These seismic attribute volumes could be, but are not restricted to, cross-correlation volumes, slope and intercept volumes, or derivative attribute volumes constructed from mathematical operations on the preceding volumes, such as sums, differences and products. For clarity, the remaining steps will be discussed in terms of using the two offset seismic data volumes.

Returning to FIG. 1, in step 102, at least one cross-section is selected from one of the offset seismic data volumes from step 101. The offset data volume used is preferably the near-offset seismic data volume, since it usually displays better detail and resolution than the far-offset volume. However, the far-offset seismic data volume could alternatively be used.

In step 103, a plurality of polygons are constructed on the selected cross-sections from step 102. The polygons need not be the same size, orientation, or from the same stratigraphic interval, but can be distributed throughout the cross-sections and the volume in any appropriate orientation or geometry. The polygons are preferably constructed by digitizing them on an input display of the selected cross-sections. The polygons in step 103 are constructed to contain an image representative of an AVO anomaly from the volume of seismic data. Preferably, enough polygons should be constructed to provide sufficiently many examples of each classification of AVO anomaly of interest to characterize the variation present in the offset seismic data volumes input in step 101. Each polygon should include both tops and bases of the interval chosen to represent the AVO anomaly.

In step 104, AVO anomaly classifications are provided for the polygons selected in step 103. Examples of AVO anomaly classifications typically used in the present invention include, but are not necessarily limited to, Class I, II, III, and IV anomalies, and background, depending upon the type of seismic data. In particular, all of the above classifications would be appropriate for zero phase seismic data, while a smaller set of classifications would be appropriate for quadrature data. It is preferred that these examples be distributed throughout the three-dimensional area of interest and that several good examples of each AVO class are found. This is especially true for the background class that generally can occupy a non-linear, potentially discontinuous, attribute space. In the case where seismic data quality and amplitudes are non-stationary, separate training sets can be developed for each region. Conversely, the location of the training examples can be explicitly considered during the classification process, so that a training example of the background that is spatially and temporally distant from the present location will have less weight than local background training examples.

In step 105, values for the maximum amplitude peak and trough values for the displayed AVO anomalies are calculated from the images in each of the constructed polygons from step 103 to represent the AVO anomaly classifications from step 104. Maximum amplitude values are calculated for both of the offset seismic data volumes selected in step 101. The maximum amplitude values are preferably calculated in a user-defined moving window. The use of a moving window mimics the process followed by a seismic interpreter, in allowing the size of the window to encompass as many traces as deemed necessary to capture the relevant properties of the representative AVO anomaly.

In step 106, AVO seismic attributes are calculated from the maximum amplitude values calculated in step 105. Examples of the AVO seismic attributes preferably used include, but are not necessarily limited to, difference, near amplitude, far amplitude, cross-correlation, near amplitude*difference, and far amplitude*difference, depending upon the type of seismic data. Here difference means the difference between the near and far amplitudes and the symbol*means the product. In particular, the last five of the above AVO seismic attributes would be appropriate for zero phase seismic data, while the first four of the AVO seismic attributes would be appropriate for quadrature data.

In step 107, a probabilistic neural network is constructed from the maximum amplitude values calculated in step 105, along with their associated AVO seismic attributes from step 106. A neural network is an interconnected assembly of simple processing elements. The processing ability of the neural network is stored in the connection strengths, or weights, obtained by a process of adaptation to, or learning from, a set of training patterns. One of the advantages of neural networks is the ability to train or modify the connection strengths within the network to produce desired results. In a classification application, a neural network can be thought of as special case of a supervised classification scheme in that the training of a neural network is a supervised exercise. Once sufficiently trained on a number of calibration images, the neural network can then be applied to the remaining images in a data volume.

Computationally, the connectivity of the nodes within a general neural network, the weights, modify an input vector of attributes and pass the modified values on to the next layer of the network. Through training, the weights of the network are modified such that on a specific set of training examples, modification of the input attribute vectors produce a desirable outcome. The training of a network and modification of connection weights results in the production of a decision surface for the network. A decision surface is an n-dimensional surface that allows the network to separate the input training data into categories. One of the advantages of a neural network algorithm over more standard classification schemes is the ability to produce non-linear boundaries. Typical classification or prediction problems commonly have only three layers, a first, input layer; a second, "hidden" layer; and a third, output layer.

Probabilistic neural networks are parallel implementations of a standard Bayesian classifier. A probabilistic neural network is a three-layer network that can efficiently perform pattern classification. Mathematically, these probabilistic neural networks are very analogous to kriging, where proximity to known points guide the classification and prediction of unknown points. In its standard form, the probabilistic neural network is not trained in the same way as the more-traditional neural network described above. Rather, the training vectors simply become the weight vectors in the first layer of the network. This simpler approach gives probabilistic neural networks the advantage of not requiring extensive training. In seismic textural analysis, for example, the textural attributes of the training images supply weight vectors in the first layer of the network. This results in a dramatic speed advantage in the training phase over more traditional types of neural network architectures, such as fully-connected back propagation architectures. Further, a probabilistic neural network tends to generalize well, whereas more traditional networks, even with large amounts of training data, are not guaranteed to converge and generalize to data not used in the training phase.

When an input pattern is presented to a probabilistic neural network, the first, or input, layer computes distances from the input vector to the training input vectors, and produces a vector whose elements indicate how close the input is to a training input. The second layer sums these contributions for each class of inputs to produce as its net output a vector of probabilities. This leads to another advantage of using probabilistic neural networks. This is the ability to extract classification probabilities directly from the second, or hidden, layer, in addition to the classification of the maximum probability from the third, or output, layer.

In the present invention, the input training points for the probabilistic neural network constructed in step 107 are the maximum amplitude values calculated in step 105 and their associated AVO seismic attributes from step 106. The output from the probabilistic neural network will be AVO anomaly classifications (and a probability volume, to be discussed below). The probabilistic neural network could then be used to classify the AVO anomalies in the entire offset seismic data volumes. However, at this point it is preferred to make a quality control check and, if deemed necessary, to modify or completely retrain the probabilistic neural network, in an interactive and iterative process. Thus, in step 108, the initial probabilistic neural network is used to classify the AVO anomaly in only a portion of the volume of seismic data from step 101. Preferably, this portion is a two-dimensional data subset, most preferably one of the cross sections already selected in step 102.

In step 109, a determination is made whether the AVO anomaly classification of the portion of the seismic data volume is satisfactory. If the determination is that the AVO anomaly classification is not satisfactory, then the process returns to step 103. The training set can be modified either through deletion of existing polygons or addition of new polygons. The probabilistic neural network is then re-created with the modified training set, and again checked. This ability to train and quality check the probabilistic neural network and then interactively modify a pre-existing training set allows the present invention to reproduce a AVO anomaly classification that an interpreter would have produced manually. Only then will the process continue to classify the entire seismic data volume. Thus, if the determination in step 109 is that the partial AVO anomaly classification is satisfactory, then the process continues to step 110.

In step 110, final AVO anomaly classifications are calculated throughout the offset seismic data volumes from step 101 using the probabilistic neural network constructed in step 107. This produces an AVO anomaly classification volume, based on the AVO anomalies produced from the user-defined polygons from step 103.

The quality of the AVO anomaly volume is dependent upon the quality of the input data. Decreasing quality of input data often occurs with increasing depth in the subsurface. Using a single calculation window size for the entire volume contributes to this negative effect. Results are improved by varying the window size throughout the volume. Preferably, the window size is made larger as data frequency decreases with increasing depth. This mode works in combination with the dynamically adjusted window size based on a user-defined confidence level. In a further alternative embodiment to deal with decreasing quality of seismic data, the data can be initially filtered with a convolution or median filter to smooth the data prior to input.

Finally, in step 111, a confidence volume is also created from the output of the probabilistic neural network. In an alternative embodiment, the confidence volume can be used dynamically during the calculation of the AVO anomaly classification volume in step 110. If a confidence falls below a user-defined level, the calculation window size can be automatically adjusted until the confidence level rises above acceptable levels, and the AVO anomaly is recalculated and reclassified accordingly.

Although multiple offset seismic data attributes are calculated and used for the AVO anomaly classification, all required attributes are calculated as needed (on the fly) in the present invention. Thus, only the offset seismic data volumes being classified, the AVO anomaly classification volume and the probability volumes are stored at any given time. No other volumes need be created. This provides an advantage in not requiring large amounts of data storage space for the present invention.

The present invention is capable of mapping AVO anomalies on a single line or through a 3D volume. The ability to transform standard near-offset and far-offset volumes into AVO anomaly volumes results in significant time reduction, improved accuracy, and reproducibility within the seismic interpretation process. AVO anomaly volumes are used for general analysis of reservoir geometry and continuity, for well placement, and to condition geologic models for use in development planning and reservoir management.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

What is claimed is:

1. A method for classifying AVO anomalies in near-offset and far-offset seismic data volumes, comprising the steps of:
    (a) calculating a plurality of initial AVO seismic attributes in the near-offset and far-offset seismic data volumes;
    (b) constructing a probabilistic neural network from the calculated initial AVO seismic attributes;
    (c) calculating AVO anomaly classifications in a portion of the near-offset and far-offset seismic data volumes, using the constructed probabilistic neural network;
    (d) repeating steps (a) through (c) until the calculated AVO anomaly classifications in the portion of the near-offset and far-offset seismic data volumes are satisfactory; and
    (e) calculating AVO anomaly classifications throughout the near-offset and far-offset seismic data volumes, using the constructed probabilistic neural network.

2. The method of claim 1, wherein the step of calculating initial AVO attributes comprises the steps of:
    selecting at least one cross-section of the near-offset and far-offset seismic data volumes;

constructing a plurality of polygons on the selected cross-sections; and calculating initial AVO seismic attributes from images in the constructed polygons.

3. The method of claim 2, wherein the step of calculating initial AVO seismic attributes comprises the steps of:

positioning a moving window within each of the polygons; and calculating the initial AVO seismic attributes in the moving-window for each of the polygons.

4. The method of claim 1, wherein the plurality of initial AVO seismic attributes are selected to be representative of the AVO anomalies in the near-offset and far-offset seismic data volumes.

5. The method of claim 4, wherein the step of calculating the plurality of initial AVO seismic attributes comprises the steps of:

calculating values for the maximum amplitude peak and trough values from the images in the moving window in each of the constructed polygons for both of the offset seismic data volumes; and calculating the initial AVO seismic attributes from the maximum amplitude peak and trough values.

6. The method of claim 1, further comprising the step of:

constructing a volume of confidence values from the constructed probabilistic neural network.

7. The method of claim 6, further comprising the steps of:

selecting a confidence level;

adjusting the size of the moving-window to keep the confidence values above the selected confidence level.

8. The method of claim 1, further comprising the step of:

displaying the AVO anomaly classifications.

* * * * *